United States Patent
Samadani et al.

(10) Patent No.: US 8,977,076 B2
(45) Date of Patent: Mar. 10, 2015

(54) THUMBNAIL BASED IMAGE QUALITY INSPECTION

(75) Inventors: Ramin Samadani, Palo Alto, CA (US); Daniel R. Tretter, San Jose, CA (US); Keith Moore, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1091 days.

(21) Appl. No.: 12/933,652

(22) PCT Filed: Mar. 20, 2008

(86) PCT No.: PCT/US2008/001439
§ 371 (c)(1), (2), (4) Date: Dec. 13, 2010

(87) PCT Pub. No.: WO2009/116962
PCT Pub. Date: Sep. 24, 2009

(65) Prior Publication Data
US 2011/0087998 A1 Apr. 14, 2011

(51) Int. Cl.
*G06K 9/20* (2006.01)
*G06K 9/32* (2006.01)
*G06K 9/36* (2006.01)
(Continued)

(52) U.S. Cl.
CPC .......... *H04N 1/32101* (2013.01); *G06T 3/0012* (2013.01); *H04N 1/0044* (2013.01); *H04N 2201/0081* (2013.01);
(Continued)

(58) Field of Classification Search
USPC ......... 382/100, 114, 173, 254–255, 260–269, 382/274–276, 282, 293, 298–301; 345/418, 345/581, 619, 660–661; 348/207.99, 222.1, 348/240.99–240.3; 715/200–201, 205–208, 715/273–274, 700, 716; 358/1.1–1.2, 1.9, 358/3.26
See application file for complete search history.

(56) References Cited

U.S. PATENT DOCUMENTS 6,148,117 A 11/2000 Lopez et al.
6,272,484 B1 8/2001 Martin et al.
(Continued)

FOREIGN PATENT DOCUMENTS

CN 1591311 A 3/2005
EP 1 764 739 A1 3/2007
(Continued)

OTHER PUBLICATIONS

Samadani, Ramin et al, "Representative Image Thumbnails for Good Browsing", IEEE Int'l Conf, Sep. 1, 2007.
(Continued)

*Primary Examiner* — Randolph I Chu
*Assistant Examiner* — Nathan Bloom

(57) ABSTRACT

An input image (7) having a first pixel resolution is acquired from an image capture system (2). A respective characterization of each of at least one visual quality feature of the input image (7) is determined. An output thumbnail image (9) is produced from the input image (7). The output thumbnail image (9) reflects the respective characterization of each visual quality feature. The output thumbnail image (9) has a second pixel resolution lower than the first pixel resolution. The output thumbnail image (9) is output in association with operation of the image capture system (2).

20 Claims, 10 Drawing Sheets

(51) Int. Cl.
*G06K 9/46* (2006.01)
*G06K 9/60* (2006.01)
*G06K 9/66* (2006.01)
*G09G 5/00* (2006.01)
*H04N 5/228* (2006.01)
*H04N 5/235* (2006.01)
*G06F 17/00* (2006.01)
*G06F 17/20* (2006.01)
*G06F 17/21* (2006.01)
*G06F 17/22* (2006.01)
*G06F 17/24* (2006.01)
*G06F 17/26* (2006.01)
*G06F 17/27* (2006.01)
*H04N 1/32* (2006.01)
*G06T 3/00* (2006.01)
*H04N 1/00* (2006.01)
*G06F 17/28* (2006.01)

(52) U.S. Cl.
CPC . *H04N 2201/0089* (2013.01); *H04N 2201/325* (2013.01); *H04N 2201/3273* (2013.01)
USPC ........... 382/299; 382/195; 382/282; 382/305; 345/670; 348/222.1; 715/207

(56) References Cited

U.S. PATENT DOCUMENTS

| | | | |
|---|---|---|---|
| 6,563,959 | B1 | 5/2003 | Troyanker |
| 7,069,506 | B2 | 6/2006 | Rosenholtz et al. |
| 7,194,701 | B2 | 3/2007 | Stavely et al. |
| 2001/0031103 | A1 | 10/2001 | Kim et al. |
| 2002/0048413 | A1 | 4/2002 | Kusunoki |
| 2002/0129114 | A1 | 9/2002 | Sundaresan et al. |
| 2002/0135621 | A1* | 9/2002 | Angiulo et al. ............... 345/838 |
| 2002/0175408 | A1 | 11/2002 | Majumdar |
| 2003/0009493 | A1 | 1/2003 | Parker et al. |
| 2003/0113017 | A1* | 6/2003 | Thomas et al. ............... 382/181 |
| 2003/0117511 | A1 | 6/2003 | Belz et al. |
| 2004/0003351 | A1 | 1/2004 | Sommerer et al. |
| 2004/0095396 | A1 | 5/2004 | Stavely et al. |
| 2004/0169891 | A1* | 9/2004 | Maurer ......................... 358/3.26 |
| 2004/0205627 | A1 | 10/2004 | Rosenholtz et al. |
| 2004/0205629 | A1 | 10/2004 | Rosenholtz et al. |
| 2005/0008257 | A1 | 1/2005 | Tsukihara |
| 2005/0017659 | A1 | 1/2005 | Catoul et al. |
| 2005/0047655 | A1 | 3/2005 | Luo et al. |
| 2005/0047659 | A1 | 3/2005 | Tanaka |
| 2005/0188304 | A1* | 8/2005 | Lawton et al. ............... 715/526 |
| 2006/0055808 | A1 | 3/2006 | Maeng et al. |
| 2006/0120599 | A1 | 6/2006 | Steinberg et al. |
| 2006/0158682 | A1 | 7/2006 | Atsumi et al. |
| 2006/0177152 | A1 | 8/2006 | Lin et al. |
| 2006/0224997 | A1 | 10/2006 | Wong et al. |
| 2007/0101268 | A1* | 5/2007 | Hua et al. ...................... 715/721 |
| 2007/0196027 | A1 | 8/2007 | Lin |
| 2008/0134094 | A1 | 6/2008 | Samadani et al. |
| 2008/0175507 | A1* | 7/2008 | Lookingbill et al. ......... 382/255 |
| 2013/0156341 | A1* | 6/2013 | Marchesotti ................. 382/275 |

FOREIGN PATENT DOCUMENTS

| | | | |
|---|---|---|---|
| JP | 10207615 | A | 8/1998 |
| JP | 10208039 | A | 8/1998 |
| JP | 11-175703 | | 2/1999 |
| JP | 2002165091 | A | 6/2002 |
| JP | 2003162532 | A | 6/2003 |
| JP | 2004264920 | A | 9/2004 |
| JP | 2009527776 | A | 7/2009 |
| JP | 2009-187548 | | 8/2009 |
| JP | 2009539244 | A | 11/2009 |
| KR | 20010049006 | A | 6/2001 |
| KR | 20010078707 | A | 8/2001 |
| KR | 20030005554 | A * | 1/2003 |
| KR | 20030005554 | A | 2/2003 |
| KR | 1020030091134 | | 12/2003 |
| KR | 20040044373 | A | 5/2004 |
| KR | 1020040107126 | | 12/2004 |
| KR | 20050108365 | A | 11/2005 |
| KR | 20060025400 | A | 3/2006 |
| WO | WO-2007098051 | A2 | 8/2007 |

OTHER PUBLICATIONS

WO SR dated Oct. 20, 2008.

Kamins T I et al: "Growth and structure 13,14 of chemically vapor deposited Ge nanowires on SI Substrates" Nano Letters vol. 4 No. 23 Jan. 23, 2004, pp. 503-506.

Sharma S et al: 'Diameter control of 12-15 Ti-catalyzed silicon nanowires', Journal of Crystal Growth, Elsevier, vol. 267, No. 3-4, Jul. 1, 2004, pp. 613-618.

Zhang Y F et al: "Germanium nanowires sheathed with an oxide layer", Physical Review, B. vol. 61, No. 7, Feb. 15, 2000, pp. 4518-4521.

Chen. L. et al., "A visual attention model for adapting images on small displays," Multimedia Systems, Digital Object Identifier, 2003, 12 pages.

Cook, R., "Stochastic Sampling in Computer Graphics," ACM Transactions on Graphics, vol. 5, No. 1, Jan. 1986, pp. 51-72.

Decarlo, D. et al., "Stylization and Abstraction of Photographs," Dept. Of Computer Science & Center for Cognitive Science, Rutgers University, In Siggraph, 2002, 8 pages.

Donoho, D., "Wavelet Shrinkage and W.V.D.: A 10-Minute Tour," (Technical Report), Stanford University, 1992, 27 pages.

International Preliminary Report on Patentability received in PCT Application No. PCT/U62008/001439, Sep. 30, 2010, 7 pages.

Setlur, V. et al., Automatic Image Retargeting, Northwestern University Computer Science Dept. Technical Report, NWU-CS-04-41, Aug. 5, 2004. 10 pages.

Suh, B. et al., "Automatic Thumbnail Cropping and its Effectiveness," Proceedings for the 16th annual ACM Conference on User interface software and technology, ACM, 2003, pp. 95-104.

International Preliminary Report on Patentability received in PCT Application No. PCT/US2007/022647, Jun. 11, 2009, 7 pages.

International Search Report & Written Opinion received in PCT Application No. PCT/US2007/022647, Apr. 30, 2008, 11 pages.

* cited by examiner

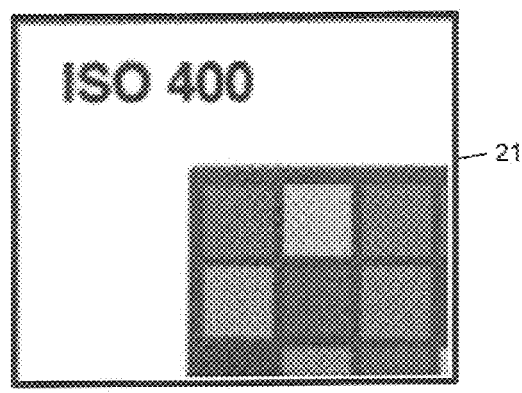
FIG. 3A (Prior Art)
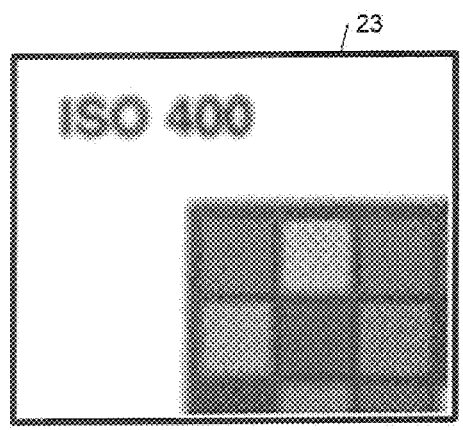
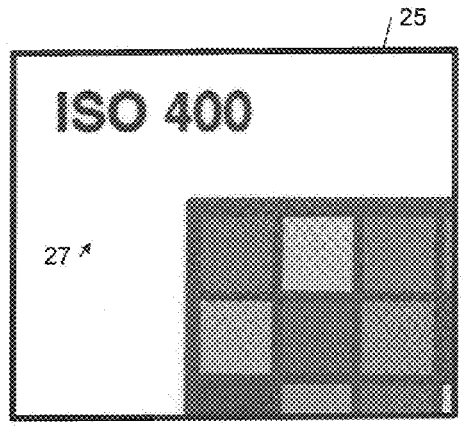
FIG. 3B　　　　　　　　　　FIG. 3C

THUMBNAIL BASED IMAGE QUALITY INSPECTION

CROSS-REFERENCE TO RELATED APPLICATIONS

This application relates to U.S. application Ser. No. 11/607,181, which was filed Dec. 1, 2006, and is incorporated herein by reference.

BACKGROUND

Imaging devices (e.g., photocopiers, scanners, digital still cameras, digital video cameras, and facsimile machines) are used to capture images of documents for many applications, including digital document generation from paper documents, high quality digital rendition of previously printed photographs, and optical character recognition. In order to avoid loss of time and errors in subsequent processing, it oftentimes is important to verify the quality of the scans (preferably at the time the image is captured). In this regard, systems have been developed to display a preview image of a captured document image before outputting the captured image to a specified destination (e.g., a printer, a storage medium, and a network). These systems typically allow the user to adjust various image capture settings and to capture another image of the document in accordance with the modified image capture settings. In these systems, however, the process of inspecting the quality of images typically is difficult. For example, in order to determine the quality of an image that was captured at a high pixel resolution, an operator or user typically needs to open the image file and pan through different zoomed-in regions of the image before the quality of various visual features in the image can be assessed properly. This process typically is laborious and time-consuming, especially given the limited viewing areas that typically are available in these systems.

SUMMARY

In one aspect, the invention features a method in accordance with which an input image having a first pixel resolution is acquired from an image capture system. A respective characterization of each of at least one visual quality feature of the input image is determined. An output thumbnail image is produced from the input image. The output thumbnail image reflects the respective characterization of each visual quality feature. The output thumbnail image has a second pixel resolution lower than the first pixel resolution. The output thumbnail image is output in association with operation of the image capture system.

The invention also features a system and a machine readable medium storing machine-readable instructions causing a machine to implement the method described above.

Other features and advantages of the invention will become apparent from the following description, including the drawings and the claims.

DESCRIPTION OF DRAWINGS

FIG. 3A is a thumbnail image of a scanned document that is produced in accordance with a prior art thumbnail generation process.

FIG. 3B is a thumbnail image of a scanned document that is produced in accordance with an embodiment of the method of FIG. 2.

FIG. 3C is a thumbnail image of a scanned document that is produced in accordance with an embodiment of the method of FIG. 2.

DETAILED DESCRIPTION

Figure 1:
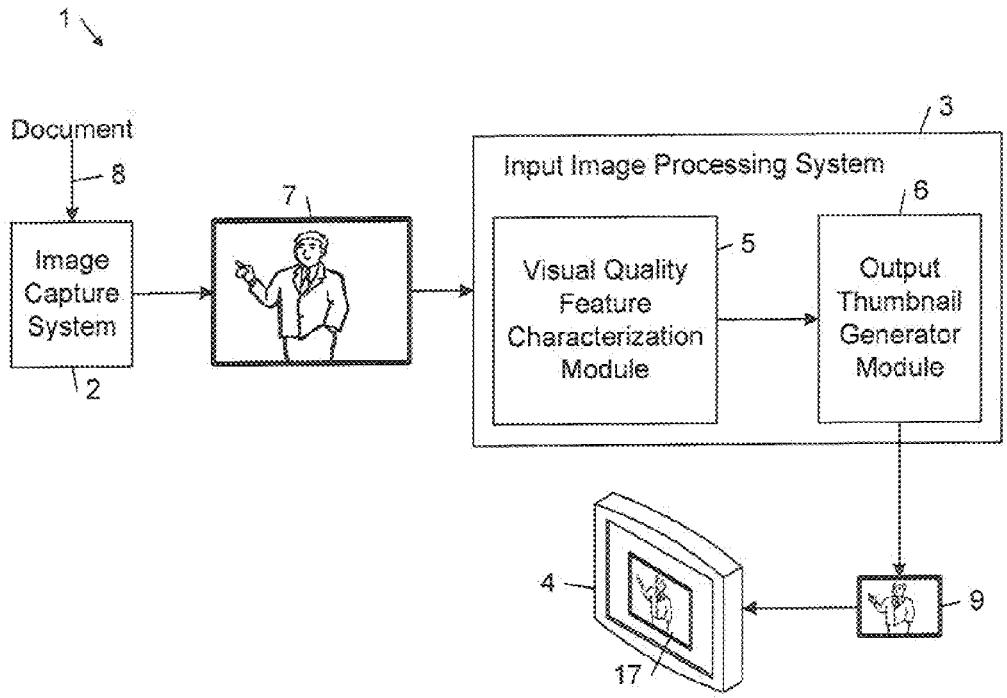
FIG. 1 is a block diagram of an embodiment of an image quality inspection system that includes an embodiment of an image processing system and a display.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail herein are capable of producing photorealistic image thumbnails that provide improved representations of visual quality features of the input images. In this way, these embodiments enable users to accurately ascertain the quality of the input images. This information may be used, for example, to quickly determine the quality of document images at the time the input images are captured by simple inspection of thumbnails of the document images without having to perform the time-consuming and laborious task of opening the original image file and panning through different zoomed-in regions of the original images. These embodiments also enable a user to readily determine the desired adjustments for various image capture settings before capturing another image of a document.

As used herein, the term "photorealistic thumbnail image" refers to a reduced-resolution version of an input image that reflects the arrangement, proportions, and local details of the corresponding input image. Photorealistic thumbnail images may contain either reproduced or synthesized elements that subjectively convey the visual appearance of the different visual elements of the corresponding input image without necessarily objectively reproducing the high resolution visual elements. In contrast, a "non-photorealistic thumbnail image" refers to a reduced-resolution version of an input image that purposefully and stylistically modifies local details of visual elements of the input image to focus the viewer's attention in a way that communicates information.

The term "document" means a set of information that is designed and presented as an individual entity and is recorded or stored in a physical storage medium (e.g., an electronic memory device or a print medium, such as paper).

The term "visual quality feature" means an attribute or property of an image that affects the perceived visual quality or appeal of the areas or regions of the image that contain that feature. Exemplary visual quality features include, but are not limited to, blur, noise, texture, colorfulness, and specular highlights.

The term "pixel resolution" refers to a count of the pixels in an image. The pixel count may be expressed, for example, as a total pixel count or as a product of the horizontal and vertical dimensions of the array of pixels corresponding to the image.

A "computer" is a machine that processes data according to machine-readable instructions (e.g., software) that are stored on a machine-readable medium either temporarily or permanently. A set of such instructions that performs a particular task is referred to as a program or software program.

The term "machine-readable medium" refers to any medium capable carrying information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

II. Overview of an Embodiment of an Image Quality Inspection System

A. Introduction

FIG. 1 shows an embodiment of an image quality inspection system 1 that includes an image capture system 2, an input image processing system 3, and a display 4. The input image processing system 3 includes a visual quality feature characterization module 5 and an output thumbnail generator module 6. In some embodiments, the image capture system 2, the input image processing system 3, and the display 4 are incorporated into a single discrete electronic device. In other embodiments, the image capture system 2, the input image processing system 3, and the display 4 are incorporated in two or more separate and discrete devices.

In operation, the image capture system 2 produces an input image 7 from a hardcopy of a document 8, and the input image processing system 3 processes the input image 7 to produce an output thumbnail image 9, which is rendered on the display 4. The input image 7 has a first pixel resolution and the output thumbnail image 9 has a second pixel resolution that is lower than the pixel resolution of the input image 7.

Figure 2:
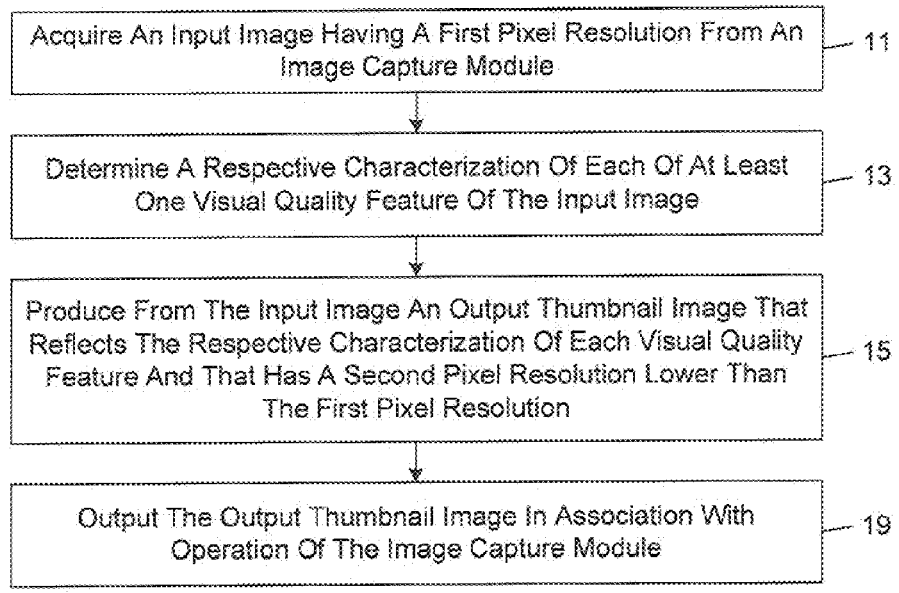
FIG. 2 is a flow diagram of an embodiment of an image processing method.

FIG. 2 shows an embodiment of a method that is implemented by the input image processing system 3. In accordance with this method, the visual quality feature characterization module 5 acquires the input image 7 from the image capture system 2 (FIG. 2, block 11). The visual quality feature characterization module 5 determines a respective characterization of each of at least one visual quality feature of the input image 7 (FIG. 2, block 13). The output thumbnail generator module 6 produces the output thumbnail image 9 from the input image 7 (FIG. 2, block 15). The output thumbnail image 9 reflects the respective characterization of each visual quality feature. The output thumbnail image 9 is output in association with the operation of the image capture system 2 (FIG. 2, block 19).

In the illustrated embodiments, the output thumbnail image 9 is output by rendering it in a preview window 17 on the display 4 in association with the operation of the image capture system 2. In other embodiments, the output thumbnail image 9 is output by storing it in a database on a machine-readable medium in association with (e.g., linked to) the input image 7 or other data (e.g., image capture parameters used to produce the input image 7) relating to the input image 7. In other embodiments, the output thumbnail image 9 is output by rendering it on a print medium (e.g., paper).

FIG. 3A shows an exemplary thumbnail image 21 of an original image of a scanned document that was produced in accordance with a prior art thumbnail generation process that involves down sampling (e.g., average down sampling) of the original image of the scanned document. In this example, the thumbnail image 21 does not reflect the actual perceivable blurriness in the original scanned document image.

FIG. 3B shows an output thumbnail image 23 of the original scanned document image from which the thumbnail image 21 was derived, except the thumbnail image 23 was produced in accordance with an embodiment of the method of FIG. 2. In this case, the thumbnail image 23 better reflects the actual perceivable blurriness in the original scanned document image than does the thumbnail image 21 shown in FIG. 3A.

FIG. 3C shows an output thumbnail image 25 of the original scanned document image from which the thumbnail image 21 was derived, except the thumbnail image 25 was produced in accordance with an embodiment of the method of FIG. 2. In this case, the thumbnail image 25 better reflects the actual perceivable bleed-through (see the faded diagonal lines 27 in the white background regions of the thumbnail image 25) in the original scanned document image than does the thumbnail image 21 shown in FIG. 3A.

By providing improved representations of the visual quality of the input image 7, the embodiments described herein enable users to quickly and accurately ascertain the quality of the original scanned images without having to perform the time-consuming and laborious task of opening the original image files and panning through different zoomed-in regions of the original images. In this way, users can readily determine whether to proceed with a predefined document processing workflow with respect to the input image 7 (e.g., perform OCR analysis on the input image, archive the input image, send a copy of the input image to a network destination, for example, by electronic mail, or print the input image)

or whether the original scanned document image should be replaced with another image of the document that is captured by the image capture system 2 using different capture settings.

B. The Image Capture System

The image capture system 2 may be implemented by any type of device or system component that is capable of generating electronic image data from the document 8. Exemplary implementations of the image capture system 2 include but are not limited to a digital image scanner, a digital still camera, a digital video camera, a digital photocopier (or simply "copier"), a facsimile machine, and a component of any of these devices.

C. The Display

The display 4 may be implemented by any type of device that is capable of visually presenting the output thumbnail image 9 to a user. The display 4 may be, for example, a flat panel display, such as a LCD (liquid crystal display), a plasma display, an EL display (electro-luminescent display) and a FED (field emission display). In some embodiments, the display 4 is implemented by a standalone computer monitor display. In other embodiments, the display 4 is implemented by a display component of a larger system (e.g., an implementation of the image capture system 2).

D. The Input Image Processing System

The input image processing system 3 may be implemented by one or more discrete modules (or data processing components) that are not limited to any particular hardware, firmware, or software configuration. In the illustrated embodiment, the visual quality feature characterization module 5 and the output thumbnail generator module 6 may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of multiple ones of the modules 5-6 are combined into a single processing component. In some embodiments, the respective functionalities of each of one or more of the modules 5-6 are performed by a respective set of multiple processing components. In some implementations, computer process instructions for implementing the methods that are executed by the input image processing system 3, as well as the data it generates, are stored in one or more machine-readable media.

III. A First Exemplary Embodiment of the Input Image Processing System

Figure 4:
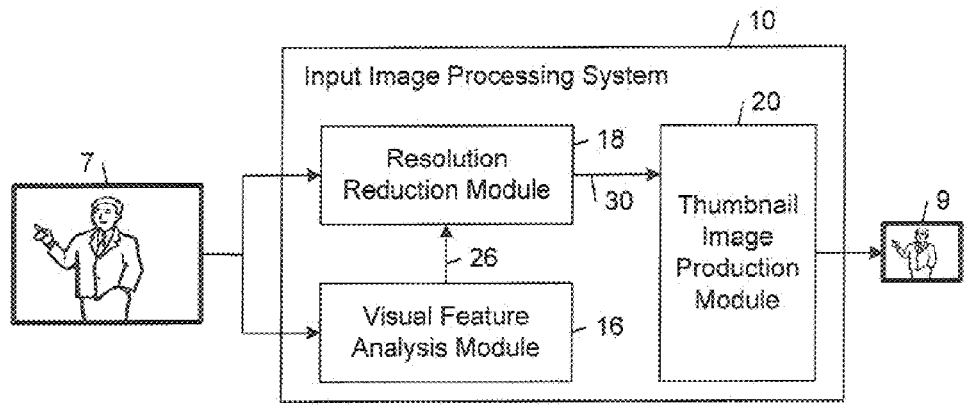
FIG. 4 is a block diagram of an embodiment of the image processing system of FIG. 1.

FIG. 4 shows an embodiment 10 of the input image processing system 3 that includes a visual feature analysis module 16, a resolution reduction module 18, and a thumbnail image production module 20. In operation, the input image processing system 10 processes the input image 7 to produce the thumbnail image 9, which is output (e.g., stored on a non-volatile computer-readable medium, stored on a volatile computer-readable medium, rendered on the display 9, or rendered on a print medium, such as paper).

The input image processing system 10 may be implemented by one or more discrete modules (or data processing components) that are not limited to any particular hardware, firmware, or software configuration. In the illustrated embodiment, the modules 16-20 may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of multiple ones of the modules 16-20 are combined into a single processing component. In some embodiments, the respective functionalities of each of one or more of the modules 16-20 are performed by a respective set of multiple processing components. In some implementations, computer process instructions for implementing the methods that are executed by the input image processing system 10, as well as the data it generates, are stored in one or more machine-readable media.

Figure 5:
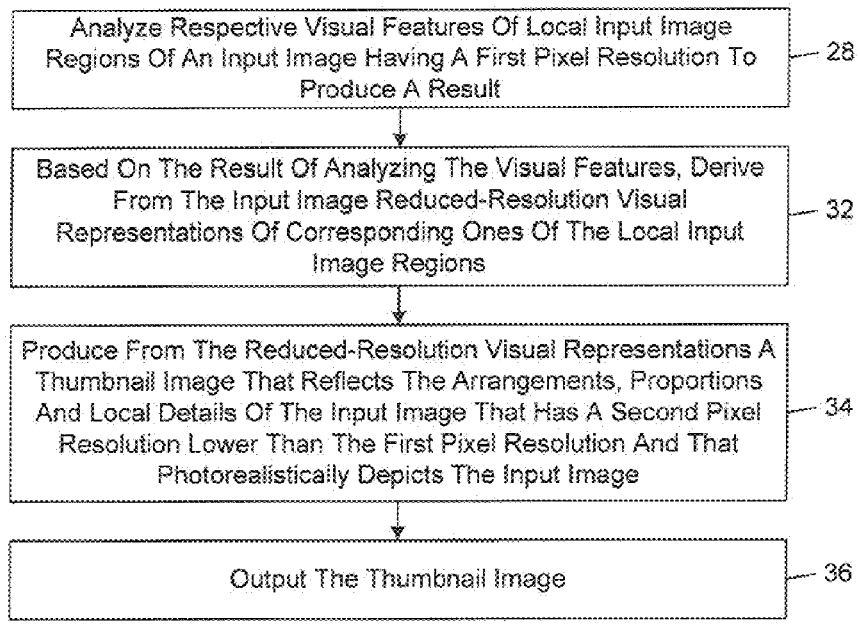
FIG. 5 is a flow diagram of an embodiment of an image processing method.

FIG. 5 shows an embodiment of a method that is implemented by the input image processing system 10.

In accordance with this method, the visual feature analysis module 16 analyzes respective visual features 26 of local input image regions of the input image 7 to produce a result (FIG. 5, block 28). In general, the result of analyzing the visual features may be values of parameters characterizing, measuring, or specifying one or more visual properties or attributes (e.g., amounts or levels of blur, noise, texture, colorfulness, or specular highlights) of the local input image regions or the result may be models representing such visual properties or attributes of the local input image regions.

Based on the result of analyzing the visual features 26, the resolution reduction module 18 derives from the input image 7 reduced-resolution visual representations 30 of corresponding ones of the local input image regions (FIG. 5, block 32). The reduced-resolution visual representations 30 typically model one or more visual feature in corresponding ones of the local input image regions. In some cases, these models correspond to the combination of the visual features and an underlying image representation. In other cases, these models correspond to a representation of the visual features themselves, in which case they typically are specified as perturbations or modifications that are to be combined with an underlying reduced-resolution representation of the input image 7.

The thumbnail image production module 20 produces the thumbnail image 9 from the reduced-resolution visual representations 30 (FIG. 5, block 34). The thumbnail image 9 has a pixel resolution that is lower than the pixel resolution of the input image 7. The thumbnail image 14 reflects the arrangement, proportions and local details of the input image 7.

The thumbnail image production module 20 outputs the thumbnail image 9 (FIG. 5, block 36). For example, in some embodiments the thumbnail image production module 20 outputs the thumbnail image 9 by storing at least a portion of the thumbnail image 9 on a machine-readable data storage medium. The machine-readable data storage medium typically is an electronic memory device, such as a computer-readable storage medium. In some embodiments, the thumbnail image production module 20 stores the entire thumbnail image 9 in the machine readable data storage medium at one time. In other embodiments, the thumbnail image production module 20 stores the thumbnail image 9 in the machine readable data storage medium on a line-by-line basis in order to meet the constraints imposed by embedded environments, such as embedded printer environments in which one or both of the processing resources and the memory resources are severely constrained. In some embodiments, thumbnail image production module 20 outputs the thumbnail image 9 by rendering the thumbnail image 9. For example, in some embodiments, the thumbnail image production module 20 renders the thumbnail image 9 on the display 4 (see FIG. 1).

In other embodiments, the thumbnail image production module 20 renders the thumbnail image 9 on a print medium (e.g., a sheet of paper).

The visual features of the local input image regions that are analyzed by the visual feature analysis module 16 correspond to one or more visual properties or attributes of the input image 7. In some embodiments, the input image processing system 10 processes the input image 7 through a single processing pipeline that simultaneously analyzes multiple visual properties or attributes of the input image 7 and derives the reduced-resolution visual representations of the local input image regions from the results of analyzing the visual properties or attributes. In other embodiments, the input image processing system 10 processes the input image 7 through a separate processing pipeline for each visual property or attribute.

Figure 6:
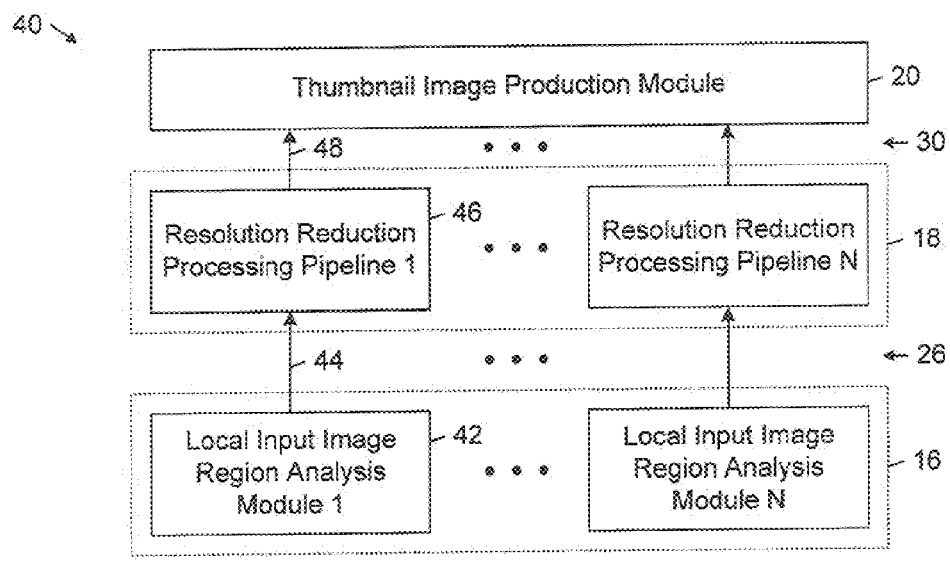
FIG. 6 is a block diagram of an embodiment of the image processing system shown in FIG. 4.

FIG. 6 shows an embodiment 40 of the input image processing system 10 in which the visual feature analysis module 16 includes N local input image region analysis modules (N has an integer value of at least two), each of which produces a respective result 44 of analyzing a respective visual property or attribute of the local input image regions. The input image processing system 40 also includes N resolution reduction processing pipelines 46, each of which derives a respective set 48 of reduced-resolution visual representations from the corresponding results 44 of analyzing the visual features of the local input image regions. In some embodiments, each set 48 of the reduced-resolution visual representations is passed to the thumbnail image production module 20 in the form of a composite reduced-resolution image or map. In other embodiments, the reduced-resolution visual representations are passed to the thumbnail image production module as separate and discrete sub-images or sub-maps respectively corresponding to individual ones of the local input image regions.

Figure 7:
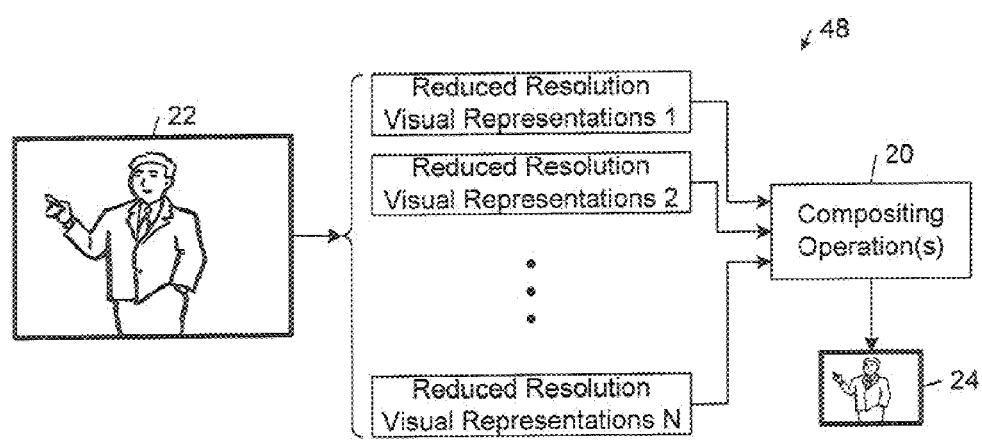
FIG. 7 is a flow diagram of information produced by an embodiment of the image processing system shown in FIG. 6.

FIG. 7 shows a flow diagram of information that is produced by the input image processing system 40 at various stages during an embodiment of a process of producing the thumbnail image 9 from the input image 7. In accordance with this process, each of the resolution reduction processing pipelines 46 derives a respective set 48 of reduced-resolution visual representations of the local input image regions from the results 44 of analyzing the visual features of the local input image regions. The resolution reduction processing pipelines 46 passes the sets 48 of reduced-resolution visual representations to the thumbnail image production module 20, which combines the sets 48 of reduced-resolution visual representations to produce the thumbnail image 9. In this process, the thumbnail image production module 20 may use one or more compositing operations (e.g., one or more of an overlay compositing operation and an addition compositing operation). Additional details regarding some of the types of compositing operations that may be used by the image production module 20 to combine the sets 48 of reduced-resolution visual representations can be found in Porter and Duff, "Compositing Digital Images," Computer Graphics, Vol. 18, No. 3, pp. 253-259 (July 1984).

IV. Exemplary Embodiments of the Components of the Input Image Processing System As explained above, embodiments of the input image processing system 10 are capable of producing the thumbnail image 9 from reduced-resolution visual representations that model visual features corresponding to one or more visual properties or attributes of the local regions of the input image 7. Exemplary visual properties or attributes that are modeled by the input image processing system 10 include, but are not limited to, blur, noise, texture, colorfulness, and specular highlights.

A. Modeling Blur in Local Input Image Regions

Figure 8:
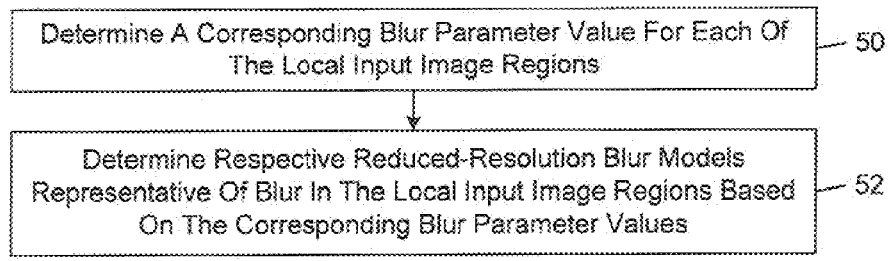
FIG. 8 is a flow diagram of an embodiment of an image processing method.

FIG. 8 shows an embodiment of a method by which the input image processing system 10 models blur in local regions of the input image 7.

In accordance with the blur modeling method of FIG. 8, the visual feature analysis module 16 determines a corresponding blur parameter value for each of the local input image regions (FIG. 8, block 50). In some embodiments, the blur parameter values are correlated with the amount of blur in the local input image regions in accordance with a particular model or visual representation of the blur in local input image regions. In other embodiments, the blur parameter values provide a direct or indirect measure of the amount of blur in the local input image regions in accordance with a particular model or visual representation of the blur in local input image regions.

The resolution reduction module 18 determines respective reduced-resolution blur models that are representative of blur in the local input image regions based on the corresponding blur parameter values (FIG. 8, block 52). In some embodiments, the blur models correspond to respective regions of a reduced-resolution base image that are blurred by respective amounts that are determined by the corresponding blur parameter values. In other embodiments, the blur models correspond to downsampled versions of the local input image regions that are filtered by respective blur filters, where the amount of blur produced by the blur filters is set by the corresponding blur parameter values.

In some embodiments, the thumbnail image production module 20 may synthesize the thumbnail image 9 from the reduced-resolution blur models, each of which corresponds to a respective local region of the thumbnail image 9. Additional details regarding the construction and operation of these embodiments are described in the disclosure relating to FIGS. 6-8 in co-pending U.S. patent application Ser. No. 11/607,181, which was filed Dec. 1, 2006.

B. Modeling Noise in Local Input Image Regions

Figure 9:
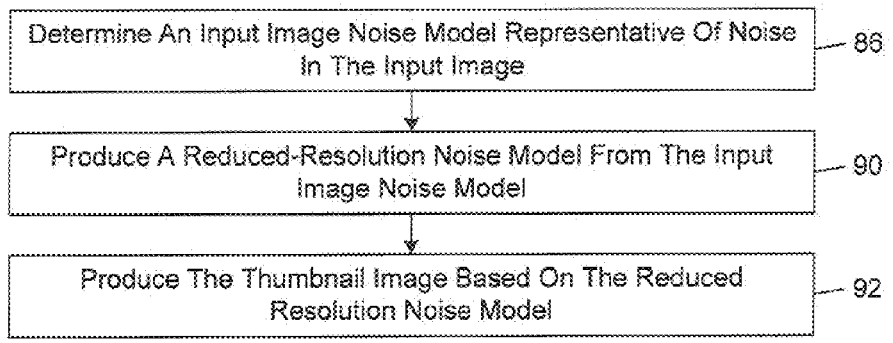
FIG. 9 is a flow diagram of an embodiment of an image processing method.
Figure 10:
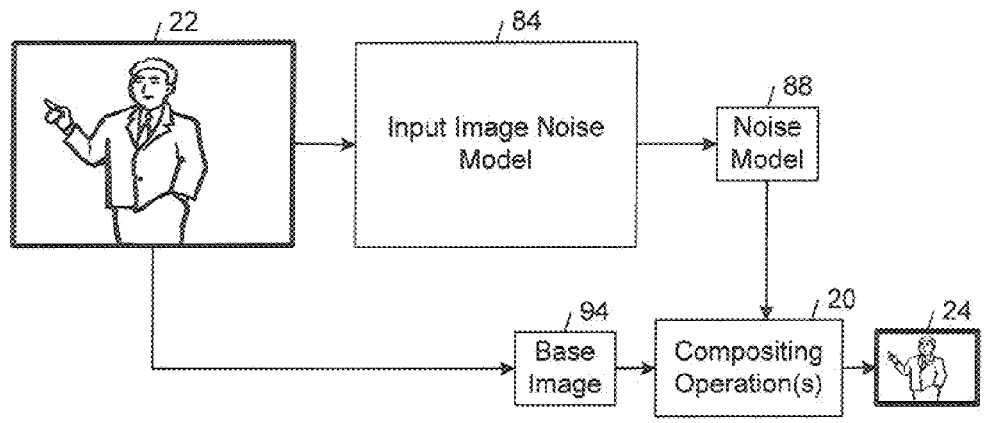
FIG. 10 is a flow diagram of information produced by an embodiment of the image processing method of FIG. 9.

FIG. 9 shows an embodiment of a method by which the input image processing system 10 models noise in local regions of the input image 7. FIG. 10 shows a flow diagram of information generated at various stages of this noise modeling method.

In accordance with the noise modeling method of FIG. 9, the visual feature analysis module 16 determines an input image noise model 84 representative of noise in the input image 7 (FIG. 9, block 86). In some embodiments, the visual feature analysis module 16 derives the input image noise model 84 from estimates of the noise variance in the input image 7. In some of these embodiments, the input image noise model is generated by computing a high-pass filtered version the input image 7 and applying a soft threshold to the resulting high-pass filtered image, where the threshold is set based on a global estimate of the noise in the input image 7.

The resolution reduction module 18 produces a reduced-resolution noise model 88 from the input image noise model 84 (FIG. 9, block 90). In some embodiments, the resolution reduction module 18 produces the reduced-resolution noise model 88 by down-sampling the input image noise model 84 to the target pixel resolution level of the thumbnail image 9. In some of these embodiments, the resolution reduction module 18 sub-samples the input image noise model 84 on a jittered grid to produce the reduced-resolution noise model 88 (see, e.g., Robert L. Cook, "Stochastic Sampling in Computer Graphics," ACM Transactions on Graphics (TOG), Volume 5, Issue 1, pp. 51-72 (January 1986)).

The thumbnail image production module 20 produces the thumbnail image 9 based on the reduced-resolution noise model (FIG. 9, block 92). In the illustrated embodiment, the thumbnail image production module 20 combines the reduced-resolution noise model 88 with a base image 94 to produce the thumbnail image 9. In some embodiments, the thumbnail image production module 20 adds the values of the pixels in the reduced-resolution noise model 88 to the values of corresponding pixels of the base image 94.

In some embodiments, the base image 94 corresponds to a standard thumbnail image that is produced by low-pass filtering and down-sampling the input image 7 to the target pixel resolution of the thumbnail image 9. In other embodiments, the base image 94 corresponds to a reduced-resolution version of the input image 7 that incorporates one or more reduced-resolution visual representations of corresponding ones of the local regions of the input image 7 in accordance with the embodiments described herein. For example, in one exemplary embodiment, the base image 94 corresponds to the reduced-resolution blur image 82 shown in FIG. 8.

Another method of generating the noise that has similar appearance to the noise in the input image involves estimating noise model parameters such as variance and spatial covariance from the input image, and then simulating a noise process that has these characteristic parameters by using filtered pseudo-random numbers.

In some embodiments, bleed-through is modeled using a modified version of one of the above-described noise modeling methods in which the noise modeling parameters are selected based on an analysis of the thumbnails produced from a set of input images that include bleed-through and selecting a set of noise modeling parameters that produce output thumbnail images that best depict the bleed-though contained in the input images.

C. Modeling Texture in Local Input Image Regions

Input images sometimes contain high spatial resolution textures. Because of their high spatial frequencies, it is impossible to accurately reflect the structures of the textures in the lower-resolution thumbnails. On the other hand, some particular aspects of the textures, such as the variations of the texture local energy, may be reflected in the lower-resolution thumbnails.

In some embodiments of the input image processing system 10, the visual feature analysis module 16 generates a local texture model, which may be represented as an image map. One method for generating the texture model is to first find areas of texture content by applying a local edge detector to the input image, and determining the edge density within local regions of the input image. Regions of high edge density are considered highly textured. This edge density map is multiplied by a high pass filtered version of the input image, to result in the texture model that approximates the high frequency textures. This map is input to the resolution reduction module 18 to generate a low resolution texture model that reflects the texture energy of the input image. In some of these embodiments, the low resolution texture energy model is generated by subsampling the image map on a jittered grid. In some embodiments, the low resolution texture model is input to the thumbnail production module 20, which adds the low resolution texture model to a base image. In some embodiments, the base image corresponds to a standard thumbnail image that is produced by low-pass filtering and down-sampling the input image 7 to the target pixel resolution of the thumbnail image 9. In other embodiments, the base image corresponds to a reduced-resolution version of the input image 7 that incorporates one or more reduced-resolution visual representations of corresponding ones of the local regions of the input image 7 in accordance with the embodiments described herein.

D. Modeling Colorfulness in Local Input Image Regions

Figure 11:
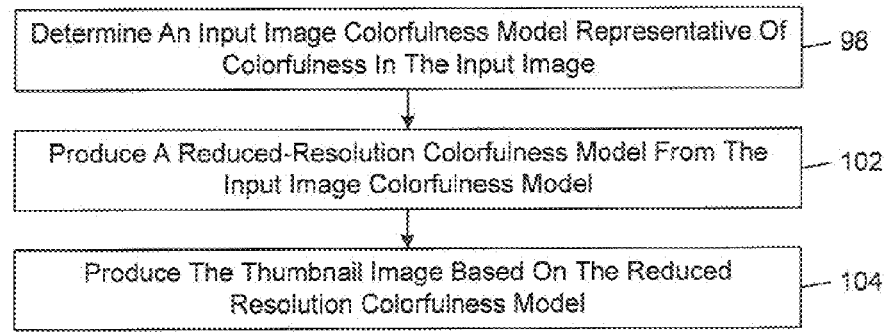
FIG. 11 is a flow diagram of an embodiment of an image processing method.
Figure 12:
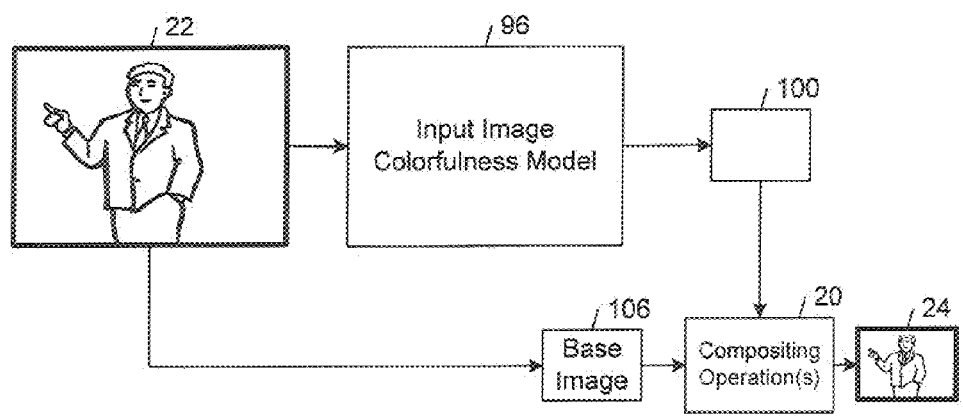
FIG. 12 is a flow diagram of information produced by an embodiment of the image processing method of FIG. 11.

FIG. 11 shows an embodiment of a method by which the input image processing system 10 models colorfulness in local regions of the input image 7. FIG. 12 shows a flow diagram of information that is generated at various stages of this colorfulness modeling method.

In accordance with the colorfulness modeling method of FIG. 11, the visual feature analysis module 16 determines an input image colorfulness model 96 representative of the colorfulness in the input image 7 (FIG. 11, block 98). The appearance of colorfulness depends on the spatial patterns in which it appears (see, e.g., Poirson et al., "Pattern-Color Separable Pathways Predict Sensitivity to Simple Colored Patterns," Vision Research, Vol. 36, No. 4, pp. 515-526 (1996)). In some embodiments, the colorfulness of the input image colorfulness model 96 may be determined by the model described by Poirson et al., and the parameters for chrominance gains of the input image colorfulness model 96 may be adjusted to modify the color appearance.

The resolution reduction module 18 produces a reduced-resolution colorfulness model 100 from the input image colorfulness model 96 (FIG. 11, block 102). In some embodiments, the resolution reduction module 18 produces the reduced-resolution colorfulness model 100 by down-sampling the input image colorfulness model 96 to the target pixel resolution level of the thumbnail image 9.

The thumbnail image production module 20 produces the thumbnail image 9 based on the reduced-resolution colorfulness model 100 (FIG. 11, block 104). In the illustrated embodiment, the thumbnail image production module 20 combines the reduced-resolution colorfulness model 100 with a base image 106 to produce the thumbnail image 9. In general, the thumbnail image production module 20 combines the reduced-resolution colorfulness model 100 with the base image 106 in a way that modifies the pixels values of the base image 106 such that the local regions of the base image 106 have colorfulness measures that approximate the colorfulness measures of corresponding regions of the reduced-resolution colorfulness model 100.

In some embodiments, the base image 106 corresponds to a standard thumbnail image that is produced by low-pass filtering and down-sampling the input image 7 to the target pixel resolution of the thumbnail image 9. In other embodiments, the base image 106 corresponds to a reduced-resolution version of the input image 7 that incorporates one or more reduced-resolution visual representations of corresponding ones of the local regions of the input image 7 in accordance with the embodiments described herein. For example, in one exemplary embodiment, the base image 106 corresponds to the reduced-resolution blur image 82 shown in FIG. 8. In another exemplary embodiment, the base image 106 corresponds to the version of the thumbnail image 9 shown in FIG. 10.

E. Modeling Specular Highlights in Local Input Image Regions

Figure 13:
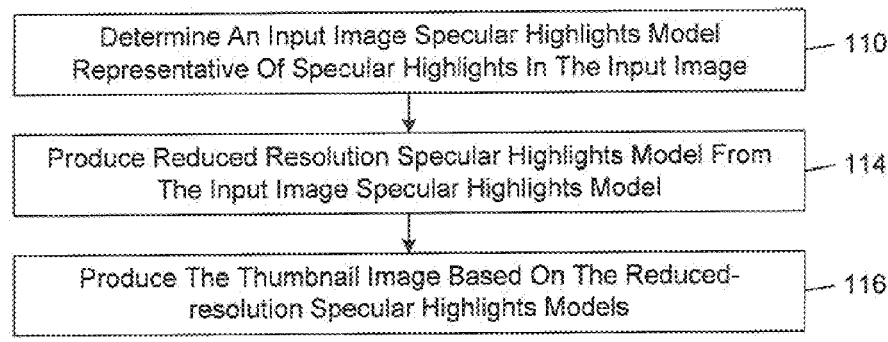
FIG. 13 is a flow diagram of an embodiment of an image processing method.
Figure 14:
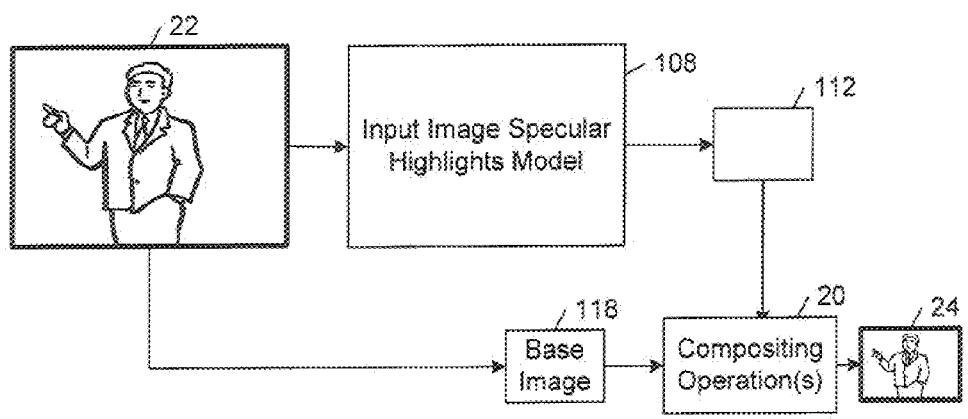
FIG. 14 is a flow diagram of information produced by an embodiment of the image processing method of FIG. 13.

FIG. 13 shows an embodiment of a method by which the input image processing system 10 models specular highlights in local regions of the input image 7. FIG. 14 shows a flow diagram of information generated at various stages of this specular highlights modeling method. Even though specular reflections due to the three-dimensional geometry of the scene do not occur during scanning of a document, the documents do sometimes depict specularity of the original scene. This specularity is sometimes lost in standard thumbnails that are generated using filtering followed by subsampling.

In accordance with the specular highlights modeling method of FIG. 13, the visual feature analysis module 16 determines an input image specular highlights model 108 representative of the specular highlights in the input image 7 (FIG. 13, block 110). In general, the visual feature analysis module 16 may detect local regions of the input image 7 that contain specular highlights in accordance with any type of specular highlights detection method. In some embodiments, the input image specular highlights model is derived by first segmenting specular regions by automatically examining image color histograms for telltale highlight colors and highlight histogram shapes, and subsequently applying a morphological operator to adaptively grow the specular regions so that they will then be more visible in the thumbnail. In some embodiments, the resulting input image specular highlights model 108 corresponds to a mask that identifies local regions of the input image 7 that contain specular highlights.

The resolution reduction module 18 produces a reduced-resolution specular highlights model 112 from the input image specular highlights model 108 (FIG. 13, block 114). In some embodiments, the resolution reduction module 18 produces the reduced-resolution specular highlights model 112 by down-sampling the input image specular highlights model 108 to the target pixel resolution level of the thumbnail image 9.

The thumbnail image production module 20 produces the thumbnail image 9 based on the reduced-resolution specular highlights model 112 (FIG. 13 block 116). In the illustrated embodiment, the thumbnail image production module 20 combines the reduced-resolution specular highlights model 112 with a base image 118 to produce the thumbnail image 9. In general, the thumbnail image production module 20 combines the reduced-resolution specular highlights model 112 with the base image 118 in a way that modifies the pixels values of the base image 118 such that the local regions of the thumbnail image 9 have specular highlights that approximate the specular highlights in corresponding regions of the reduced-resolution specular highlights model 112. In some embodiments, the thumbnail image production module 20 may use one or more compositing operations to add artificial specular highlights to the base image 118 in accordance with the specular highlights model 112.

In some embodiments, the base image 118 corresponds to a standard thumbnail image that is produced by low-pass filtering and down-sampling the input image 7 to the target pixel resolution of the thumbnail image 9. In other embodiments, the base image 118 corresponds to a reduced-resolution version of the input image 7 that incorporates one or more reduced-resolution visual representations of corresponding ones of the local regions of the input image 7 in accordance with the embodiments described herein. For example, in one exemplary embodiment, the base image 118 corresponds to the reduced-resolution blur image 82 shown in FIG. 8. In another exemplary embodiment, the base image 118 corresponds to the version of the thumbnail image 9 shown in FIG. 10. In another exemplary embodiment, the base image 118 corresponds to the version of the thumbnail image 9 shown in FIG. 12.

V. A Second Exemplary Embodiment of the Input Image Processing System

Figure 15:
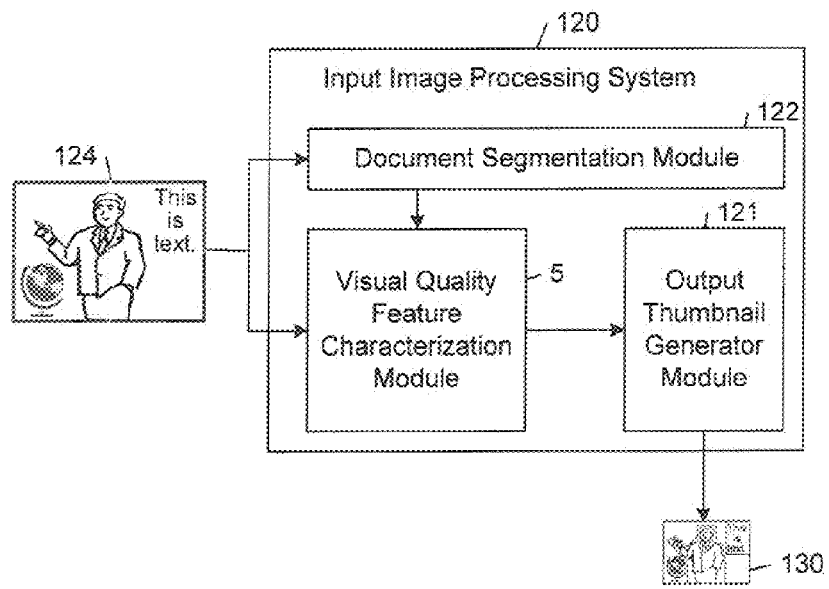
FIG. 15 is a block diagram of an embodiment of the image processing system of FIG. 1.

FIG. 15 shows an embodiment 120 of the input image processing system 3. The input image processing system 120 includes the visual quality feature characterization module 5, an embodiment 121 of the output thumbnail generator module 6, and a document segmentation module 122.

Figure 16:
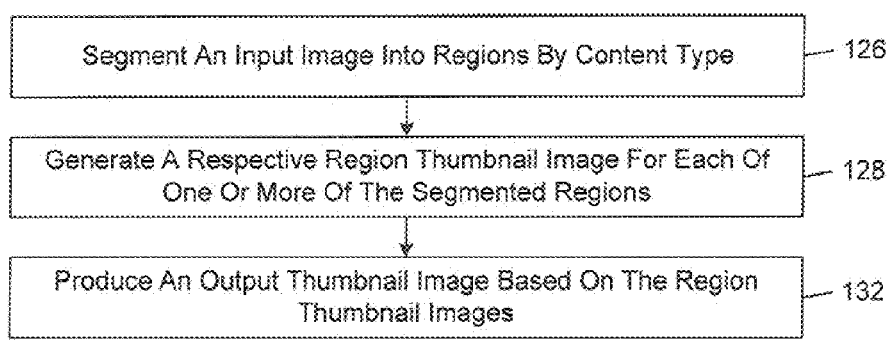
FIG. 16 is a flow diagram of an embodiment of an image processing method.

FIG. 16 shows an embodiment of a method that is implemented by the input image processing system 120.

Figure 17:
FIG. 17 is a diagrammatic view of an image that has been segmented by content type in accordance with an embodiment of the method of FIG. 16.

In accordance with this embodiment, the document segmentation module 122 segments an input image 124 into regions by content type (FIG. 16, block 126). In this process, the document segmentation module 122 analyzes the contents of an input image 124 to identify regions of different content type (e.g., text regions, photographic image regions, and graphic regions). The document segmentation module 122 may segment the input image 124 into different content regions in any of a wide variety of different ways. Preliminarily, the document segmentation module 122 typically analyzes the input image 124 to identify the particular types of information that it contains. In this process, the rows of pixels are scrutinized to determine the boundaries of regions of text and other content data types (e.g., photos, line art, and graphics). The document segmentation module 122 may use a variety of different types of document analysis processes for this purpose, including a "projection cut" process (also referred to as "block segmentation" process), which uses successive vertical and horizontal cuts through the document, a "connected component/smearing" process (see, e.g., K. Y. Wong et al., "Document Analysis System," IBM J. Res. Development, vol. 6, pp. 647-656, November 1982), and a "threshold, smear, and connected component" process (see, e.g., Pavlidis et al., "Page Segmentation and Classification," CVGIP: Graphical Models and Image Processing, vol. 54, no. 6, November 1992, pp. 484-496). In the illustrated embodiment, the document segmentation module 122 has detected a line art (or graphics) region 136, a photograph region 134, and a text region 138 in the exemplary input image 124, as shown in the enlarged view of the input image 124 presented in FIG. 17. The document segmentation module 122 typically determines boundaries (also referred to as "bounding boxes") for each of the identified regions and passes the bounding boxes to the visual quality feature characterization module 5.

The visual quality feature characterization module 5 and the output thumbnail generator module 6 process each of the segmented regions in accordance with one or more of the thumbnail image generation methods described above to generate a respective region thumbnail image for each of one or more of the segmented regions (FIG. 16, block 128). Each of the region thumbnail images has a pixel resolution lower than the pixel resolution of the input image 124. In some embodiments, the respective type and parameters of the thumbnail image generation process used to generate each region thumbnail depends on the detected content of the corresponding input image region. The visual quality feature characterization module 5 and the output thumbnail generator module 6 also typically produce a base thumbnail image for the entire input image 124.

The output thumbnail generator module 6 produces a composite output thumbnail image 130 based on the individual region thumbnail images (FIG. 16, block 132). The output thumbnail generator module 121 may produce the composite output thumbnail image 130 in a variety of different ways. In some embodiments, the output thumbnail generator module 121 overlays each of the region thumbnail images over the corresponding area of a base thumbnail image that was generated for the input image 124 in its entirety. In other embodiments, the output thumbnail generator module 130 may use one or more compositing operations (e.g., one or more of an overlay compositing operation and an addition compositing operation) to combine the region thumbnails with a base thumbnail image that was generated for the input image 124 in its entirety. Additional details regarding the types of compositing operations that may be used by the image production module 20 to combine the sets 48 of reduced-resolution visual representations can be found in Porter and Duff, "Compositing Digital Images," Computer Graphics, Vol. 18, No. 3, pp. 253-259 (July 1984).

Figure 18:
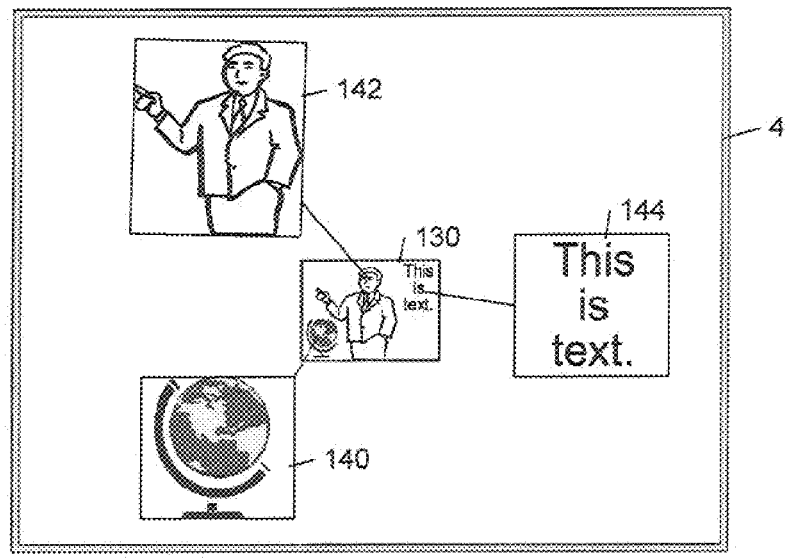
FIG. 18 is a diagrammatic view of an embodiment of a display presenting a rendering of a thumbnail image and thumbnail images of segmented regions of the thumbnail image in accordance with an embodiment of the method of FIG. 16.

In some embodiments, a single composite output thumbnail image 130 is rendered on the display 4. In other embodiments, one or more of the composite thumbnail image 130 and the individual region thumbnail images are rendered on the display. FIG. 18 shows an exemplary presentation of the composite thumbnail image 130 and the individual region thumbnail images on the display 4. In this embodiment, a respective hyperlink associates each of the region thumbnail images 140, 142, 144 with a corresponding region of the composite output thumbnail image 130. Graphical representations of the hyperlinks (e.g., graphical mouseover effect or highlighted region boundaries) are rendered on the corresponding regions of the composite output thumbnail image 130. Each of the region thumbnail images 140-144 is rendered on the display 4 in response to user selection of the corresponding graphical representation of the associated hyperlink. In some embodiments, the presentation of each of the region thumbnail images 140-144 may persist indefinitely until actively closed by the user or disappear after a predetermined delay period.

VI. A Third Exemplary Embodiment of the Input Image Processing System

Figure 19:
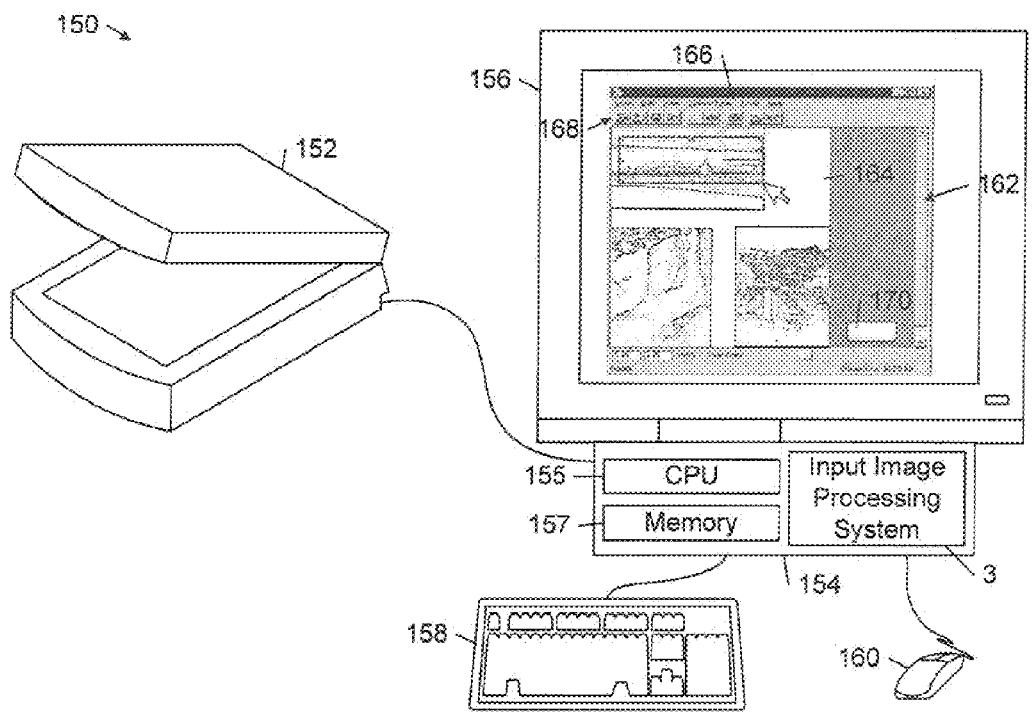
FIG. 19 is a diagrammatic view of an embodiment of the image processing system of FIG. 1.

FIG. 19 shows an embodiment 150 of the image quality inspection system 1 in which the image capture system 2 is implemented by a document scanner 152 (e.g., a ScanJet® scanner available from Hewlett-Packard Company of Palo Alto, Calif., U.S.A.), the input image processing system 3 is incorporated in a computer system 154, and the display 4 is implemented by a computer display monitor 156 that is controlled by a display controller in the computer 154.

The computer system includes a processing unit (CPU) 155, a system memory 157, and a system bus that couples processing unit to the various components of the computer system. The processing unit 155 typically includes one or more processors, each of which may be in the form of any one of various commercially available processors. The system bus may be a memory bus, a peripheral bus or a local bus, and may be compatible with any of a variety of bus protocols, including PCI, VESA, Microchannel, ISA, and EISA. The computer system 154 also includes a persistent storage memory (e.g., a hard drive, a floppy drive, a CD ROM drive, magnetic tape drives, flash memory devices, and digital video disks) that is connected to the system bus and contains one or more computer-readable media disks that provide non-volatile or persistent storage for data, data structures and computer-executable instructions.

The system memory 157 typically includes a read only memory (ROM) that stores a basic input/output system (BIOS) that contains start-up routines for the computer system and a random access memory (RAM). The system memory 157 also stores the embodiment of the input image processing system 3, a GUI driver, and a database containing image files corresponding to the input image 7 and the output thumbnail image 9, intermediate processing data, and other data. In some embodiments, the computer system 154 additionally includes a scanning application program that incorporates the input image processing system 3 and is configured to control the operation of the document scanner 152 and render image data on the display monitor 156.

A user may interact (e.g., enter commands or data) with the computer system using one or more input devices (e.g., a keyboard 158, a computer mouse 160, a microphone, joystick, and touch pad). The computer system 154 also typically includes peripheral output devices, such as speakers and a printer. One or more remote computers may be connected to the computer system 154 through a network interface card (NIC).

Information may be presented through a graphical user interface (GUI) 162 that is displayed to the user on the computer display monitor 156. The GUI 162 typically is integrated into a scanning software tool (e.g., the HP Precision-Scan® scanning software available from Hewlett-Packard Company of Palo Alto, Calif.). The GUI 162 includes menus 166 and toolbars 168 that present options for controlling the operation of the document scanner 152 including one or more user-selectable tools enabling modification of one or more image capture parameters of the imaging module. The GUI 162 also includes a user-selectable control button 170. In response to user selection of the control button 170, the computer system 154 proceeds with the execution of a predefined document processing workflow (e.g., perform OCR analysis on the input image 7, archive the input image 7 in a database stored on a machine-readable medium, print the input image 7, or send a copy of the image to a network destination, for example, by electronic mail).

In the illustrated embodiment, the GUI 162 also includes a preview window 164 for reviewing scanned images that are captured by the document scanner 152. Thumbnail versions of the scanned images are presented in the preview window 164. As explained above, these thumbnail images provide improved representations of the visual quality of the corresponding scanned images. In this way, users can quickly and accurately ascertain the quality of the original scanned images without having to perform the time-consuming and laborious task of opening the original image files and panning through different zoomed-in regions of the original images. As a result, users can determine whether to proceed with a predefined document processing workflow with respect to the input image (e.g., perform OCR analysis on the input image, archive the input image, or print the input image) or whether the original scanned document image should be replaced with another image of the document that is captured by the document scanner 152 using different capture settings.

IX. A Third Exemplary Embodiment of the Input Image Processing System

Figure 20:
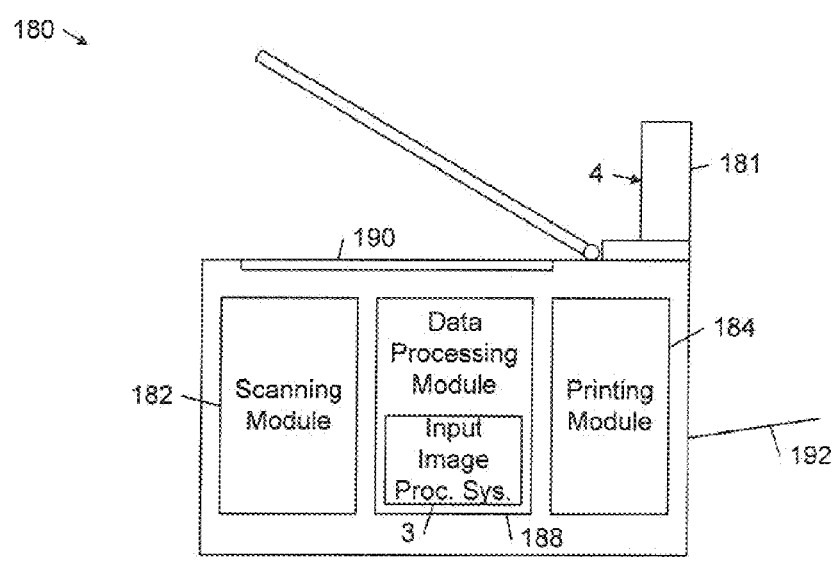
FIG. 20 is a diagrammatic view of an embodiment of the image processing system of FIG. 1.

FIG. 20 shows an embodiment of the image quality inspection system 1 that is implemented by a photocopier system 180. The photocopier system 180 includes the input image processing module 3, a control panel 181 that includes the display 4, a scanning module 182, a printing module 184, a data processing module 188, a transparent platen 190, and an output tray 192.

The scanning module 182 may be implemented by a standard image capture subsystem of any of a photocopying machine, a document scanner, a facsimile machine, and the like. The scanning module 182 typically includes one or more image sensors, one or more lenses, and one or more light sources for illuminating objects placed on the platen 190.

The printing module 184 may be implemented by a standard printing subsystem of any of a photocopying machine, a document printer, a facsimile machine, and the like. The printing module 184 typically includes a print engine that applies a marking agent (e.g., toner or ink) to a print medium (e.g., paper).

The data processing module 188 includes a processor and a machine-readable memory. In the illustrated embodiment, the input image processing module 3 is implemented in computer software or firmware that includes machine-readable instructions that are stored on the machine-readable memory and retrieved for execution by the processor. The input image processing module 3 typically is integrated into a scanning software tool that includes a GUI. The GUI typically presents options for controlling the operation of the photocopier system 180 including one or more user-selectable tools enabling modification of one or more image capture parameters of the imaging module. The GUI also typically includes a user-selectable workflow control button. In response to user selection of the workflow control button, the photocopier system 180 proceeds with the execution of a predefined document processing workflow (e.g., print the scanned input image). The GUI also includes a preview window for reviewing scanned image captured by the scanning module 182. Thumbnail versions of the scanned images that are captured by the scanning module 182 are presented in the preview window. As explained above, these thumbnail images provide improved representations of the visual quality of the corresponding scanned images. In this way, users can quickly and accurately ascertain the quality of the original scanned images without having to perform the time-consuming and laborious task of opening the original image files and panning through different zoomed-in regions of the original images. As a result, users can determine whether to proceed with a predefined document processing workflow with respect to the input image (e.g., print the scanned input image) or whether the original scanned document image should be replaced with another image of the document that is captured by the scanning module 182 using different capture settings.

X. Conclusion

The embodiments that are described in detail herein are capable of producing photorealistic image thumbnails that provide improved representations of visual quality features of the input images. In this way, these embodiments enable users to accurately ascertain the quality of the input images. This information may be used, for example, to quickly determine the quality of document images at the time the input images are captured by simple inspection of thumbnails of the document images without having to perform the time-consuming and laborious task of opening the original image files and panning through different zoomed-in regions of the original images. These embodiments also enable a user to readily determine the desired adjustments for various image capture settings before capturing another image of a document.

Other embodiments are within the scope of the claims.

What is claimed is:

1. A computer-implemented method, comprising:
    acquiring an input image having a first pixel resolution from an image capture system;
    segmenting the input image into regions by content type;
    for each of the segment regions of the input image,
        determining a respective characterization of each of at least one visual quality feature of the segmented region, and
        producing from the segmented region a respective region thumbnail image that reflects the respective characterization of each determined visual quality feature and that has a respective pixel resolution lower than the first pixel resolution;
    generating an output thumbnail image based on the region thumbnail images; and
    outputting the output thumbnail image in association with operation of the image capture system.

2. The method of claim 1, wherein the producing comprises producing the output thumbnail image such that it reflects the arrangements, proportions, and local details of the input image.

3. The method of claim 1, wherein:
    the determining comprises deriving a respective characterization of each visual quality feature from each of one or more local regions of the input image, each characterization corresponding to a respective reduced-resolution visual representation of the respective visual quality feature in a respective one of the local regions; and
    the producing comprises producing the output thumbnail image from the reduced-resolution visual representations.

4. The method of claim 1, wherein:
    the determining comprises determining a respective blur parameter value for each of one or more local regions of the input image; and
    for each of the local regions, determining a respective blur model at the second pixel resolution based on the respective blur parameter value.

5. The method of claim 1, wherein the determining comprises determining a noise model characterizing noise in the input image at the second pixel resolution, and the producing comprises producing a base image at the second pixel resolution based on a sub-sampling of the input image and producing the output thumbnail image based on a combination of the noise model with the base image.

6. The method of claim 1, wherein the determining comprises selecting a noise model (84) that characterizes bleed-through in the input image (7), and the producing comprises producing the output thumbnail image (9) based on the selected noise model (84).

7. The method of claim 1, further comprising for each of one or more of the segmented regions, generating a respective hyperlink associating the region thumbnail image with a corresponding region of the output thumbnail image; and
    wherein the outputting comprises rendering a graphical representation of each of the hyperlinks on corresponding regions of the output thumbnail image and in response to user selection of the graphical representation of a particular one of the one or more hyperlinks rendering the region thumbnail image associated with the particular hyperlink.

8. The method of claim 1, wherein the outputting comprises rendering the output thumbnail image in a preview window on a display in association with operation of the image capture system.

9. The method of claim 8, wherein the rendering comprises rendering the output thumbnail image in a preview window of a graphical user interface that presents one or more user-selectable tools enabling modification of one or more image capture parameters of the image capture system.

10. The method of claim 9, wherein the rendering comprises presenting in the graphical user interface a user-selectable button; and further comprising proceeding with a predefined document processing workflow in response to user selection of the button.

11. Apparatus, comprising:

a display;

a memory; and a processing unit coupled to the memory and the display and operable to perform operations comprising acquiring an input image having a first pixel resolution from an image capture system;

segmenting the input image into regions by content type;

for each of the segmented regions of the input image, determining a respective characterization of each of at least one visual quality feature of the segmented region, and;

based on the content type of the segmented region, producing from the segmented region a respective region thumbnail image that reflects the respective characterization of each determined visual quality feature and that has a respective pixel resolution lower than the first pixel resolution;

generating an output thumbnail image based on the region thumbnail images; and outputting the output thumbnail image in association with operation of the image capture system.

12. The apparatus of claim 11, wherein in the producing the processing unit is operable to produce the output thumbnail image such that it reflects the arrangements, proportions, and local details of the input image.

13. The apparatus of claim 11, wherein:

in the determining the processing unit is operable to derive a respective characterization of each visual quality feature from each of one or more local regions of the input image, each characterization corresponding to a respective reduced-resolution visual representation of the respective visual quality feature in a respective one of the local regions; and in the producing the processing unit is operable to produce the output thumbnail image from the reduced-resolution visual representations.

14. The apparatus of claim 11, wherein:

in the determining the processing unit is operable to determine a respective blur parameter value for each of one or more local regions of the input image; and for each of the local regions, the processing unit is operable to determine a respective blur model at the second pixel resolution based on the respective blur parameter value.

15. The apparatus of claim 11, wherein in the determining the processing unit is operable to determine a noise model characterizing noise in the input image at the second pixel resolution, and in the producing the processing unit is operable to produce a base image at the second pixel resolution based on a sub-sampling of the input image and producing the output thumbnail image based on a combination of the noise model with the base image.

16. The apparatus of claim 11, wherein for each of one or more of the segmented regions the processing unit is operable to perform operations comprising generating a respective hyperlink associating the region thumbnail image with a corresponding region of the output thumbnail image; and wherein the outputting comprises rendering a graphical representation of each of the hyperlinks on corresponding regions of the output thumbnail image and in response to user selection of the graphical representation of a particular one of the one or more hyperlinks rendering the region thumbnail image associated with the particular hyperlink.

17. The apparatus of claim 11, wherein in the outputting the processing unit (155) is operable to render the output thumbnail image in a preview window on the display in association with operation of the image capture system.

18. A non-transitory computer readable medium storing computer-readable instructions causing a computer to perform operations comprising:

acquiring an input image having a first pixel resolution from an image capture system;

segmenting the input image into regions by content type;

for each of the segmented regions of the input image, determining a respective characterization of each of at least one visual quality feature of the segmented region, and based on the content type of the segmented region, producing from the segmented region a respective region thumbnail image that reflects the respective characterization of each determined visual quality feature and that has a respective pixel resolution lower than first pixel resolution;

generating an output thumbnail image based on the region thumbnail images; and rendering the output thumbnail image in a preview window on a display in association with operation of the image capture system.

19. The method of claim 1, wherein the segmenting comprises identifying in the input image regions of different content type selected from text content regions, photographic content regions, and graphic content regions, and segmenting the identified regions as respective ones of the segmented regions.

20. The method of claim 1, wherein for each of the segmented regions of the input image, the producing is based on the content type of the segmented region.

* * * * *

UNITED STATES PATENT AND TRADEMARK OFFICE
CERTIFICATE OF CORRECTION

| | | |
|---|---|---|
| PATENT NO. | : 8,977,076 B2 | Page 1 of 1 |
| APPLICATION NO. | : 12/933652 | |
| DATED | : March 10, 2015 | |
| INVENTOR(S) | : Ramin Samadani et al. | |

It is certified that error appears in the above-identified patent and that said Letters Patent is hereby corrected as shown below:

Claims

In column 17, line 13 approx., in Claim 11, delete "and;" and insert -- and --, therefor.

In column 18, line 34 approx., in Claim 18, delete "first" and insert -- the first --, therefor.

Signed and Sealed this
Sixth Day of October, 2015

Michelle K. Lee
*Director of the United States Patent and Trademark Office*